United States Patent [19]
Sawada

[11] Patent Number: 6,004,046
[45] Date of Patent: Dec. 21, 1999

[54] OPTICAL MODULE AND METHOD OF MAKING THE SAME

[75] Inventor: Sosaku Sawada, Yokohama, Japan

[73] Assignee: Sumitomo Electric Industries, Ltd., Osaka, Japan

[21] Appl. No.: 08/982,036

[22] Filed: Dec. 1, 1997

[30] Foreign Application Priority Data

Nov. 29, 1996 [JP] Japan .................................. 8-319839

[51] Int. Cl.$^6$ ...................................................... G02B 6/36
[52] U.S. Cl. ............................................................ 385/92
[58] Field of Search ................................ 362/555, 560; 385/88–94

[56] References Cited

U.S. PATENT DOCUMENTS

| | | | |
|---|---|---|---|
| 5,367,590 | 11/1994 | Devenport et al. | 385/39 |
| 5,390,265 | 2/1995 | Jiao | 385/15 |
| 5,515,468 | 5/1996 | DeAndrea et al. | 385/88 |
| 5,771,322 | 7/1998 | Matsumoto et al. | 385/31 |
| 5,803,575 | 9/1998 | Ansems et al. | 362/32 |

FOREIGN PATENT DOCUMENTS

| | | |
|---|---|---|
| 55-118681 | 9/1980 | Japan . |
| 63-090866 | 4/1988 | Japan . |
| 63-300578 | 12/1988 | Japan . |

*Primary Examiner*—Hung N. Ngo
*Attorney, Agent, or Firm*—Smith, Gambrell & Russell, LLP

[57] ABSTRACT

The present invention relates to an optical module having a configuration in which centering adjustment can be effected much more easily than the prior art, while keeping a high optical coupling efficiency between an optical fiber and a semiconductor device, and can reduce the number of parts, for example; and a method of making the same. The optical module comprises, as an element for optically coupling the optical fiber and the semiconductor device together, an optical reflecting member having a concave reflecting surface. Since it is necessary for the reflecting member to be positioned with a high accuracy in the field of optical communications to which this optical module is supposed to be utilized, in particular, the reflecting member is provided with a specific positioning configuration.

24 Claims, 9 Drawing Sheets

OPTICAL MODULE AND METHOD OF MAKING THE SAME

BACKGROUND OF THE INVENTION

1. Field of the Invention

The present invention relates to an optical module incorporating therein a semiconductor device such as light-receiving device or light-emitting device used in optical communications and, in particular, to an optical module having a configuration for optically coupling an optical fiber and the semiconductor device with each other with a high accuracy, and a method of making the same, or the like.

2. Related Background Art

In a conventional optical module in which an optical fiber, as a signal light transmitting medium, is optically coupled with a semiconductor device such as a light-receiving device or a light-emitting device, typically employed is a configuration in which, together with the semiconductor device, a condenser lens and a planar reflecting surface, which are disposed in an optical path between an end face of the optical fiber and the semiconductor device, are integrally sealed with a transparent resin so as to keep an optical coupling state between the optical fiber and the semiconductor device. As an example of the conventional optical module, Japanese Patent Application Laid-Open No. 63-090866 discloses a light-receiving module having a configuration in which light emitted from an end face of an optical fiber, which is a signal light transmitting medium, passing through a condenser lens is reflected by a planar reflecting surface so as to be made incident on the light-receiving surface of a light-receiving device.

SUMMARY OF THE INVENTION

As a result of studies concerning the conventional optical modules such as the above-mentioned light-receiving module and the like, the inventors have found the following problems.

Namely, while the conventional modules employ a configuration in which the condenser lens and planar reflecting mirror, together with the semiconductor device such as a light-receiving device, are integrally sealed with a transparent resin, it is necessary for the condenser lens, the planar reflecting mirror, and the semiconductor device to be aligned with each other in terms of optical axis in this configuration. Therefore, sealing with the resin must be effected after the position of the semiconductor device is set with respect to the outer form of the sealing resin with a sufficiently high accuracy. Nevertheless, it is quite difficult to improve such positioning accuracy in the semiconductor device, thus making this configuration unsuitable for manufacturing optical modules applied to the field of optical communications.

In addition, though the conventional optical modules are applicable to a field where a relatively high accuracy is not required, i.e., in the field where light incident on a light-receiving device is relatively wide and the light-receiving device is allowed to have a relatively large light-receiving area; a very high centering accuracy is required in the field of optical communications where the optical fiber has a core diameter on the order of only several $\mu m$ and the light-receiving device can only secure a light-receiving area on the order of several hundred $\mu m^2$. Consequently, in the case where an optical module for optical communications is made by use of the prior art, due to an insufficient centering accuracy, the optical coupling efficiency between the optical fiber and the semiconductor device may decrease and may not satisfy a required specification, thus inhibiting the productivity from improving, for example.

On the other hand, as the communication speed in optical fiber communications has recently increased to a gigahertz band, there is a demand for developing optical modules which can yield a higher centering accuracy.

In order to overcome the foregoing problems, it is an object of the present invention to provide an optical module having a configuration in which centering can be effected much more easily than in the prior art while keeping a high optical coupling efficiency between its optical fiber and semiconductor device and enabling, for example, the number of its parts to reduce; a method of making the same; or the like. It is also an object of the present invention to provide a constituent part having a specific form applied to this optical module, a method of positioning this constituent part, and an apparatus for its positioning.

In order to achieve the above-mentioned objects, the optical module according to the present invention comprises a housing accommodating a semiconductor device therein and having a mount surface for holding the semiconductor device thereon; a sleeve extending in a predetermined direction from a side wall of the housing and supporting a ferrule attached to a tip of an optical fiber as being accommodated therein; and an optical reflecting member accommodated in the housing, having a curved reflecting surface, for optically coupling the optical fiber and the semiconductor device with each other. Here, the semiconductor device includes, at least, a light-emitting device and a light-receiving device. Accordingly, the optical module encompasses a light-transmitting module incorporating therein a light-emitting device, in which the light-emitting surface of the light-emitting device and the light-entering end face of the optical fiber are optically coupled with each other, and a light-receiving module incorporating therein a light-receiving device, in which the light-receiving surface of the light-receiving device and the light-emitting end face of the optical fiber are optically coupled with each other.

In particular, it is preferred that the reflecting surface of the optical reflecting member be shaped as a concave surface, which matches a part of a side surface of a virtually defined rotational ellipsoid. In order to attain a high centering accuracy, the optical reflecting member having such a specifically shaped reflecting surface is installed at a predetermined position within the housing so that a core end face of the optical fiber facing the reflecting surface coincides with a first focal point of the rotational ellipsoid having a side surface matching the reflecting surface, and that a main surface of the semiconductor device (the light-emitting surface in the light-emitting device or the light-receiving surface in the light-receiving device) facing the reflecting surface coincides with a second focal point of the rotational ellipsoid different from the first focal point.

Due to this configuration, in the case where the optical module is a light-receiving module, even when a signal light is emitted from the light-emitting end face of the optical fiber with a predetermined angle of divergence, as long as the light-emitting end face coincides with the second focal point, the light is reflected by any part of the reflecting surface so as to reach the light-receiving surface of the light-receiving device and thus is received thereby. In the case where the optical module is a light-transmitting module, on the other hand, light emitted from the light-emitting surface of the light-emitting device with a predetermined angle of divergence reaches the light-entering end face of the optical fiber due to the above-mentioned action of the reflecting surface. Here, the end face of the optical fiber including the core end face is inclined with respect to the optical axis of the optical fiber by a predetermined angle.

While the optical reflecting member may be constituted by any of a resin molded member, a glass formed member, and a metal member formed by cutting a metal material; the reflecting surface thereof is coated with a metal material in either case.

Since the optical module according to the present invention is an optical element applicable to the field of optical communications, the optical reflecting member employed in this optical module has various configurations enabling highly accurate positioning.

Namely, the optical reflecting member according to the present invention comprises a lower surface to face the mount surface of the housing, an upper surface opposing the lower surface, and at least one recess (engagement groove) extending from the upper surface toward the lower surface. In particular, this recess has an important function for positioning the optical reflecting member with a high accuracy, and the optical reflecting member can be held by tweezers or the like when two recesses are provided, thus making it easier to handle the optical reflecting member.

The shape of the recess is defined by a tapered side surface such that the bottom of the recess has an area smaller than the area of the opening thereof coinciding with the upper surface of the optical reflecting member. Preferably, the optical reflecting member is provided with a plurality of protrusions extending from the lower surface toward the mount surface of the housing such that the lower surface is separated from the mount surface by a predetermined distance. In this configuration, the bonding area between the mount surface and the lower surface can be reduced, thus making it easy to change the relative positional relationship between the optical reflecting member and the housing (positioning step of the optical reflecting member).

In order to specifically position the optical reflecting member, the following steps are successively performed. Namely, within the sleeve of the housing (whose mount surface has already held a semiconductor device thereon), a ferrule attached to a tip of an optical fiber is inserted. Subsequently, under the condition that the semiconductor device is covered with the concave reflecting surface, the optical reflecting member is installed within the housing such that a predetermined part of the optical reflecting member having a resin with a bonding function abuts to the mount surface of the housing with the resin interposed therebetween. Then, while the intensity of signal light outputted from the optical fiber (in the case of a light-transmitting module) or the electric signal outputted from the semiconductor device (in the case of a light-receiving module) is being monitored, the relative positional relationship between the housing and the optical reflecting member is changed.

Thus positioned optical reflecting member and housing are bonded together as the resin disposed between the member and the mount surface of the housing is cured. Also, since the positioning of the ferrule is not effected in this positioning step of the optical reflecting member, the ferrule is installed at a predetermined position within the sleeve in a state where a predetermined auxiliary member is attached to its tip.

A positioning apparatus for positioning an optical reflecting member in the manner mentioned above comprises, at least, a supporting table for installing and holding a housing at a predetermined position; a supporting mechanism for supporting a ferrule attached to a tip of an optical fiber to be inserted into a sleeve of the housing; a securing member (cantilever) having a structure for pressing the optical reflecting member against the mount surface of the housing and securing a relative positional relationship between the housing and the optical reflecting member; and a driving mechanism for changing the relative positional relationship between the housing and the optical reflecting member.

Here, under the condition that the semiconductor device is covered with the reflecting surface, the optical reflecting member is installed within the housing such that a predetermined part of the optical reflecting member having a resin with a bonding function abuts to the mount surface of the housing with the resin interposed therebetween. In order to relatively move the supporting table, on which the housing is installed, with respect to the optical reflecting member and the cantilever, the driving mechanism comprises an X stage for moving the supporting table along a first reference axis (X axis), a Y stage for moving the supporting table along a second reference axis (Y axis) which is orthogonal to the first reference axis, and a Z stage for rotating the supporting table around a third reference axis (Z axis) which is orthogonal to the first and second reference axes.

A tip of the cantilever is provided with a tapered protrusion to be inserted into a recess formed in the upper surface of the optical reflecting member. As this protrusion engages with the recess of the optical reflecting member, the optical reflecting member is secured.

In the method of making an optical module according to the present invention, the ferrule is attached to the sleeve, after the operations for positioning and bonding/securing the optical reflecting are completed, as follows. First, the ferrule coated with an ultraviolet-curing resin at a predetermined part of its side surface is subjected to a centering operation while being inserted into the sleeve having a plurality of through holes. Then, a gap between the side surface of the ferrule and the inner wall of the sleeve is irradiated with an ultraviolet rays, thereby a part of the inner wall of the sleeve other than the through holes is bonded to the side surface of the ferrule (temporary bonding step). Subsequently, a two-part mixture epoxy resin (comprised of two-part adhesive) is injected into a part of the through holes in the sleeve, whereas a one-part epoxy resin is injected into the rest of the through holes, and the two-part mixture epoxy resin is cured at room temperature, thereby a part of the side surface of the ferrule exposed through the part of through holes and the sleeve are bonded together. Finally, the one-part epoxy resin is heated so as to be cured, thereby a part of the side surface of the ferrule exposed through the rest of through holes and the sleeve are bonded together.

The ferrule and sleeve subjected to the foregoing steps are secured to each other by at least three kinds of adhesives having different curing processes, thereby the positional deviation during the bonding step can effectively be suppressed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, embodiments of the optical module according to the present invention, the method of making the same, and the like will be explained with reference to FIGS. 1 to 19. Among the drawings, portions identical to each other will be referred to with numerals identical to each other without their overlapping explanations being repeated. Though the optical module encompasses a light-receiving module employing a light-receiving semiconductor device and a light-transmitting module employing a light-emitting semiconductor device, since these modules are substantially the same in terms of configuration except for the kinds of semiconductor devices employed, only the light-receiving module will be explained hereinbelow.

Figure 1:
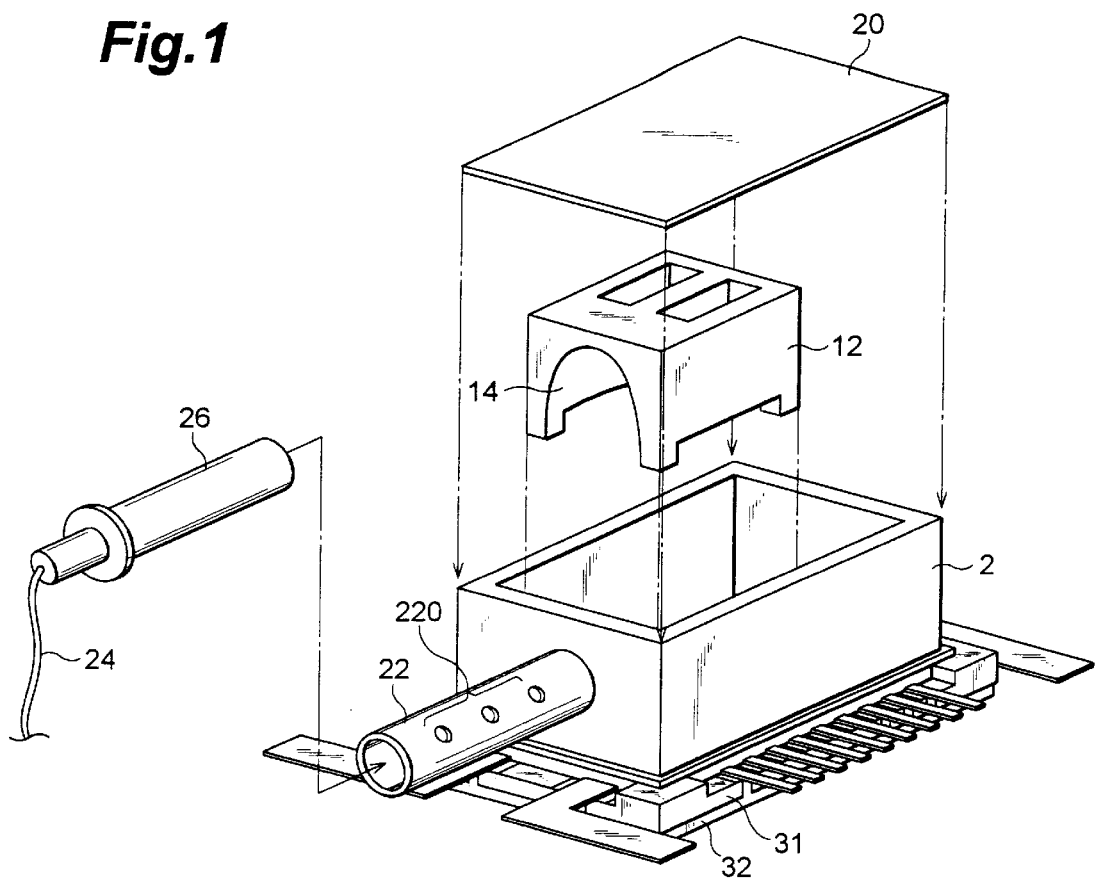
FIG. 1 is a view showing an assembling step for explaining a schematic configuration of an optical module according to the present invention.
Figure 2:
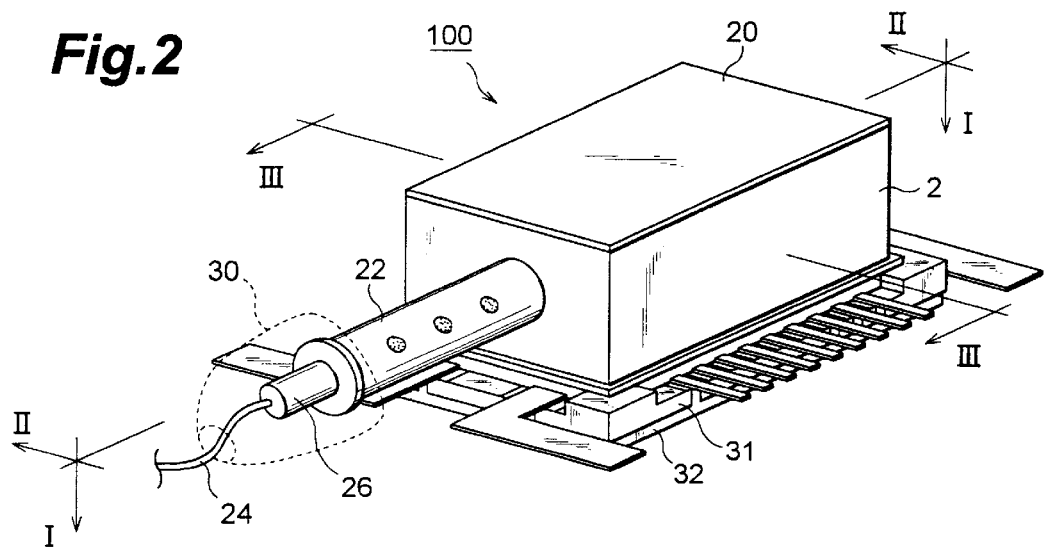
FIG. 2 is a perspective view showing an appearance of the optical module according to the present invention obtained through the assembling step shown in FIG. 1.

FIG. 1 is a view showing an assembling step for explaining a schematic configuration of a light-receiving module according to the present invention, whereas FIG. 2 is a perspective view showing an appearance of the light-receiving module according to the present invention obtained through the assembling step shown in FIG. 1.

As shown in FIG. 1, the light-receiving module according to the present invention comprises a housing 2 accommodating therein a light-receiving device as a semiconductor device and having a mount surface for holding the semiconductor device. The housing 2 is provided with a sleeve 22 extending in a predetermined direction from a side wall and supporting a ferrule 26 attached to a tip of an optical fiber 24 in a state where the ferrule 26 is accommodated therein. Attached to the bottom portion of the housing 2 by way of an insulating member 31 is an electrode plate 32, while a plurality of lead terminals are supported by the insulating member 31. Some of the plurality of lead terminals are electrically connected to the electrode plate 32.

Further, an optical reflecting member 12 and the bottom portion (mount surface for the light-receiving device) are bonded together by a predetermined adhesive, whereas an opening portion of the housing 2 and a lid 20 are bonded together by a predetermined adhesive. Also, the ferrule 26 is bonded and secured to the sleeve 22 while being inserted therein. The ferrule 26 and optical fiber 24 are protected with a rubber cover 30 or the like as shown in FIG. 2. As shown in FIG. 1, the sleeve 22 is provided with a plurality of through holes 220 for bonding the ferrule which extend along the projecting direction of the sleeve 22.

Figure 3:
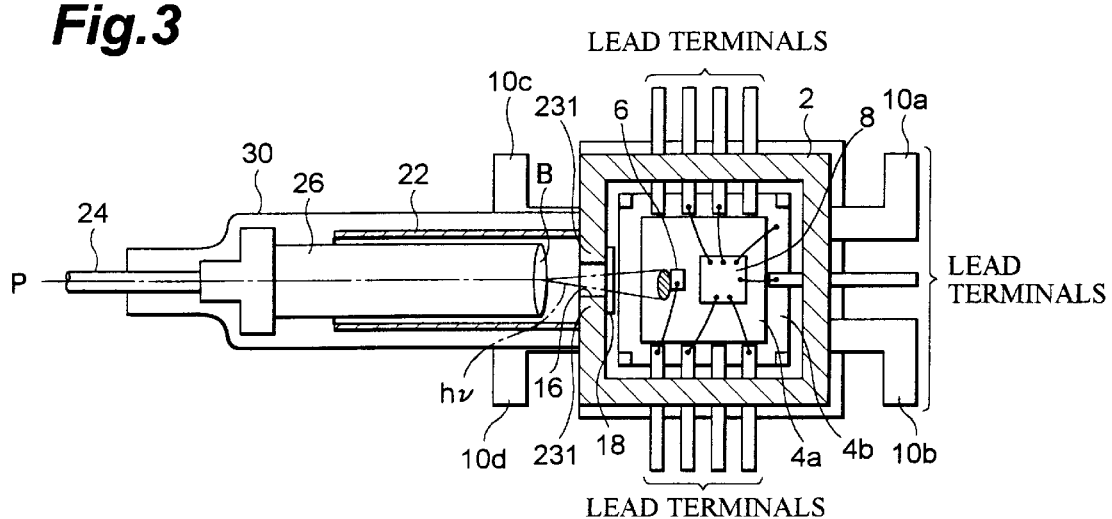
FIG. 3 is a sectional view showing the optical module according to the present invention taken along line I—I in FIG. 2.
Figure 4:
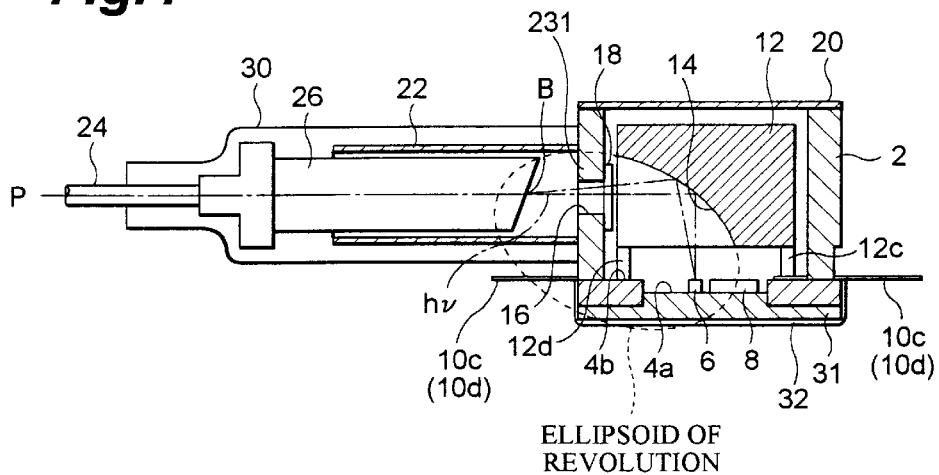
FIG. 4 is a sectional view showing the optical module according to the present invention taken along line II—II in FIG. 2.
Figure 5:
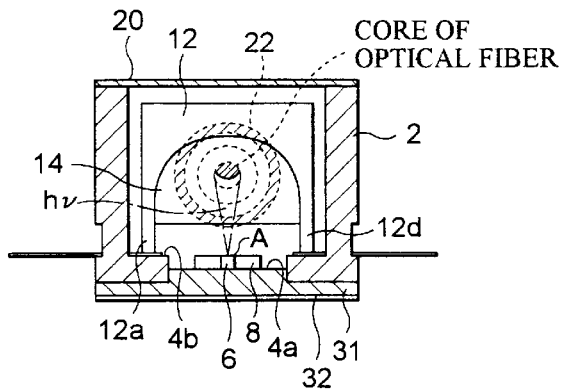
FIG. 5 is a sectional view showing the optical module according to the present invention taken along line III—III in FIG. 2.
Figure 6:
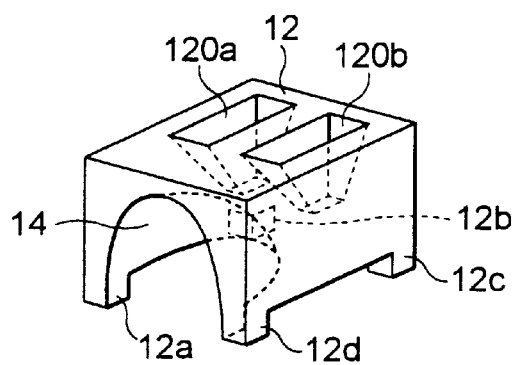
FIG. 6 is a perspective view showing a configuration of an optical reflecting member according to the present invention.

In the following, an inner configuration of the light-receiving module according to the present invention will be explained. FIGS. 3 to 5 are sectional views showing the light-receiving module according to the present invention respectively taken along lines I—I, II—II, and III—III in FIG. 2, whereas FIG. 6 is a perspective view showing a configuration of the optical reflecting member according to the present invention.

In the sectional views respectively shown in FIGS. 2 to 5, onto an inner bottom surface 4a of the housing 2 that is molded from a resin and has a rectangular shape, a light-receiving device 6 such as PIN photodiode and a preamplifier circuit 8 for amplifying an electric signal outputted from the light-receiving device 6, each as a semiconductor chip (bare chip), are firmly attached. Disposed on side ends of the housing 2 are a plurality of lead terminals such as power supply lead terminals 10a and 10b for supplying power to the light-receiving device 6 and the preamplifier circuit 8, a signal output terminal for transmitting an output signal of the preamplifier circuit 8 to the outside, grounding lead terminals 10c and 10d, and the like. These lead terminals are connected to the light-receiving device 6 and preamplifier circuit 8 by wire-bonding. Of the plurality of lead terminals, the power supply lead terminals 10a and 10b and the grounding lead terminals 10c and 10d are formed somewhat wider so as to reduce impedance and inductance, for example, thus preventing unstable operations, such as deterioration in high-frequency characteristics and high-frequency oscillation, from occurring.

Formed in a side wall of the housing 2 is a light entrance hole 16 having a predetermined inside diameter defined by a flange 231. The light entrance hole 16 is covered with a transparent window member 18 (e.g., sapphire window) firmly attached to the inner end face of the housing 2.

Attached to the outer end face of the housing 2 is a barrel shaped sleeve 22 corresponding to the light entrance hole 16. The ferrule 26 attached to the tip of the optical fiber 24 is inserted into the sleeve 22.

Disposed above the light-receiving device 6 and the preamplifier circuit 8 are the optical reflecting member 12 having a substantially rectangular form molded from a resin as shown in FIG. 6. Its lower end portions 12a, 12b, 12c and 12d respectively disposed at four corners thereof are firmly attached to the other inner bottom surface 4b (included in the mount surface) of the housing 2 by an adhesive or the like. Here, the upper surface of the optical reflecting member 12 is provided with two engagement grooves 120a and 120b contributing to positioning the optical reflecting member 12 itself while making it easier to be handled with tweezers or the like. Also, in this embodiment, the device-mount surface of the housing 2 includes the above-mentioned surfaces 4a and 4b.

The surface of the optical reflecting member 12 opposing the light-receiving device 6 is formed with a concave reflecting surface 14 matching a part of a side surface of a rotational ellipsoid. The optical reflecting member 12 is installed so that the light-receiving surface of the light-receiving device 6 coincides with one focal point A of the rotational ellipsoid, and that the light-emitting end face (including the core end face) of the optical fiber 24 received in the ferrule 26 coincides with the other focal point B (see FIG. 8).

The upper end opening of the housing 2 is closed with the lid 20, thereby the inside of the housing 2 is hermetically sealed in a state where the optical reflecting member 12 is secured to a predetermined position.

Here, the reflecting surface 14 of the optical reflecting member 12 is positioned with respect to the light-receiving device 6 and the light-emitting end face of the optical fiber 24 in the following manner, for example. First, the optical reflecting member 12 formed separately from the housing 2 is inserted into the housing 2. Subsequently, the optical reflecting member 12 is firmly attached to the inner bottom end face 4b of the housing 2 by an adhesive or the like after their positions with respect to each other are adjusted such that the light-receiving surface of the light-receiving device 6 coincides with one focal point A of the rotational ellipsoid, and the light-emitting end face of the core in the optical fiber 24 coincides with the other focal point B, thus effecting positioning. In this positioning step, even after the optical reflecting member 12 is loaded into the housing 2, the light-emitting end face of the optical fiber 24 can be caused to coincide with the focal point B when the position of the light-emitting end face of the optical fiber 24 received in the ferrule 26 is minutely adjusted along the optical axis P.

In the light-receiving module having such a configuration, a signal light hv emitted with a predetermined angle of divergence from the light-emitting end face of the optical fiber 24 coinciding with the focal point B passes through the light entrance hole 16 and the window member 18 so as to reach the reflecting surface 14. The signal light hv reflected by the reflecting surface 14 is collected so as to reach the light-receiving surface of the light-receiving device 6. Here, since the light-receiving surface of the light-receiving device 6 and the light-emitting end surface of the optical fiber 24 respectively coincide with the focal points A and B, even when the signal light hv emitted from the light-emitting end face has various emitting directions and is thereby reflected at different positions on the reflecting surface 14, it would always reach the light-receiving surface of the light-receiving device 6. Accordingly, a centering mechanism with an essentially high accuracy is realized, while the direction of the light-emitting end face of the optical fiber 24 can easily be adjusted thereby.

Figure 7:
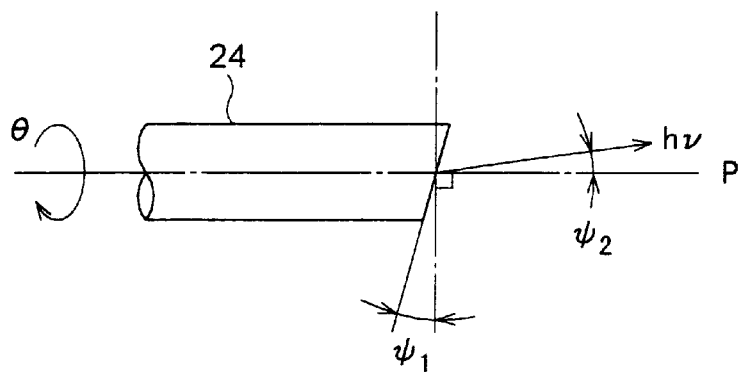
FIG. 7 is a view for explaining functions of the optical module according to the present invention and, in particular, the shape of an end face of an optical fiber.
Figure 8:
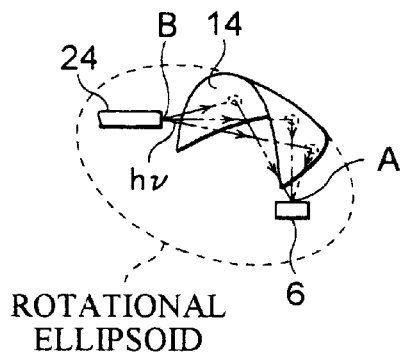
FIG. 8 is a view for explaining functions of the optical module according to the present invention and, in particular, a function of centering the optical fiber and a semiconductor device with respect to each other.

Also, in order to prevent the light reflected by the light-emitting end face of the optical fiber 24 from returning onto the same optical axis, this end face is obliquely ground so as to form a predetermined angle $\psi_1$ (e.g., $\psi_1=8°$) with respect to the optical axis P of the optical fiber 24 as shown in FIG. 7, thereby the signal light hv emitted from the thus obliquely-cut light-emitting end face is bent with respect to the optical axis P by an angle $\psi_2$ (e.g., $\psi_2=4°$) which is ½ of the grinding angle $\psi_1$. Consequently, when the light-emitting end face of the optical fiber 24 is rotated around the optical axis P by an angle θ, it becomes uncertain in which direction the signal light hv is emitted since the direction depends on the angle of rotation. In this case, in the conventional light-receiving module having a configuration in which light is reflected by a planar reflecting mirror, the emitted light is likely to deviate from the light-receiving surface of the light-receiving device, thus lowering the optical coupling efficiency, necessitating minute adjustment with a very high accuracy, and so forth. By contrast, in the light-receiving module according to the present invention, as shown in FIG. 8, as long as the light-emitting end face of the optical fiber 24 coincides with the focal point B, even when the light hv is emitted in various directions, it would be reflected at any position in the reflecting surface 14 so as to constantly reach the light-receiving surface of the light-receiving device 6 positioned at the focal point A. Accordingly, the influence of the dependency on angle of rotation can be neglected, thus making it unnecessary to adjust the angle of rotation θ of the optical fiber 24.

Also, since the optical reflecting member 12 is formed separately from the housing 2, even after being installed at a predetermined position within the housing 2, its position of attachment can easily be adjusted minutely as long as it is not firmly bonded. Further, in such a configuration, it is not necessary to realize an accurate centering mechanism by combining a plurality of optical elements together. Thus, an essentially excellent centering mechanism can be realized by the single optical reflecting member 12, thereby the number of parts can be reduced. Also, the number of locations to be adjusted, the packaging area, the packaging cost, the centering cost, and the like can be reduced.

Though the lower end portions 12a, 12b, 12c, and 12d are respectively formed at the four corners of the optical reflecting member 12 shown in FIG. 6 in order to form a predetermined gap between the light-receiving device 6 and the reflecting surface 14, it should not be restricted to such a configuration. Any configuration may be employed as long as it can yield a gap which prevents the lower end of the optical reflecting member 12 from coming into contact with the light-receiving device 6 and the preamplifier circuit 8. For example, when the inner bottom surface 4a for firmly bonding the optical reflecting member 12 is positioned higher than the inner bottom surface 4b for firmly bonding the light-receiving device 6 and preamplifier circuit 8, so as to form a step structure such that the optical reflecting member 12 is mounted on the inner bottom surface 4b located at the higher position, the lower end portions 12a, 12b, 12c, and 12d can be omitted.

Though this embodiment relates to the optical reflecting member 12 molded from a resin, it may be realized by a glass-formed member made as glass is melted and molded, or by cutting a metal material. The optical reflecting member 12 made of a glass formed member or by cutting a metal material is firmly attached to the inner bottom end of the housing 2 by brazing with a metal, for example.

In addition, the reflecting surface 14 of each of the optical reflecting member 12 molded from a resin, that is made as a glass material is melted and formed, and that is made by cutting a metal material is coated with a metal reflecting light such as gold (Au), silver (Ag), aluminum (Al), or the like by vapor deposition, sputtering, or the like. In view of the reflecting efficiency with respect to the signal light wavelength band (1.3 μm or 1.5 μm) currently used in optical communications, gold (exhibiting a reflectivity of about 90%) or silver (exhibiting a reflectivity of about 99%) is used in preference to aluminum (exhibiting a reflectivity of about 80%). In order to attain a long-term stability in view of corrosion of the reflecting surface or the like, on the other hand, aluminum or gold is used in preference to silver. Also, in view of the adherence by coating, aluminum is preferably employed.

In the following, explanation will be provided for a positioning apparatus for specifically realizing an operation for positioning the optical reflecting member 12.

Figure 9:
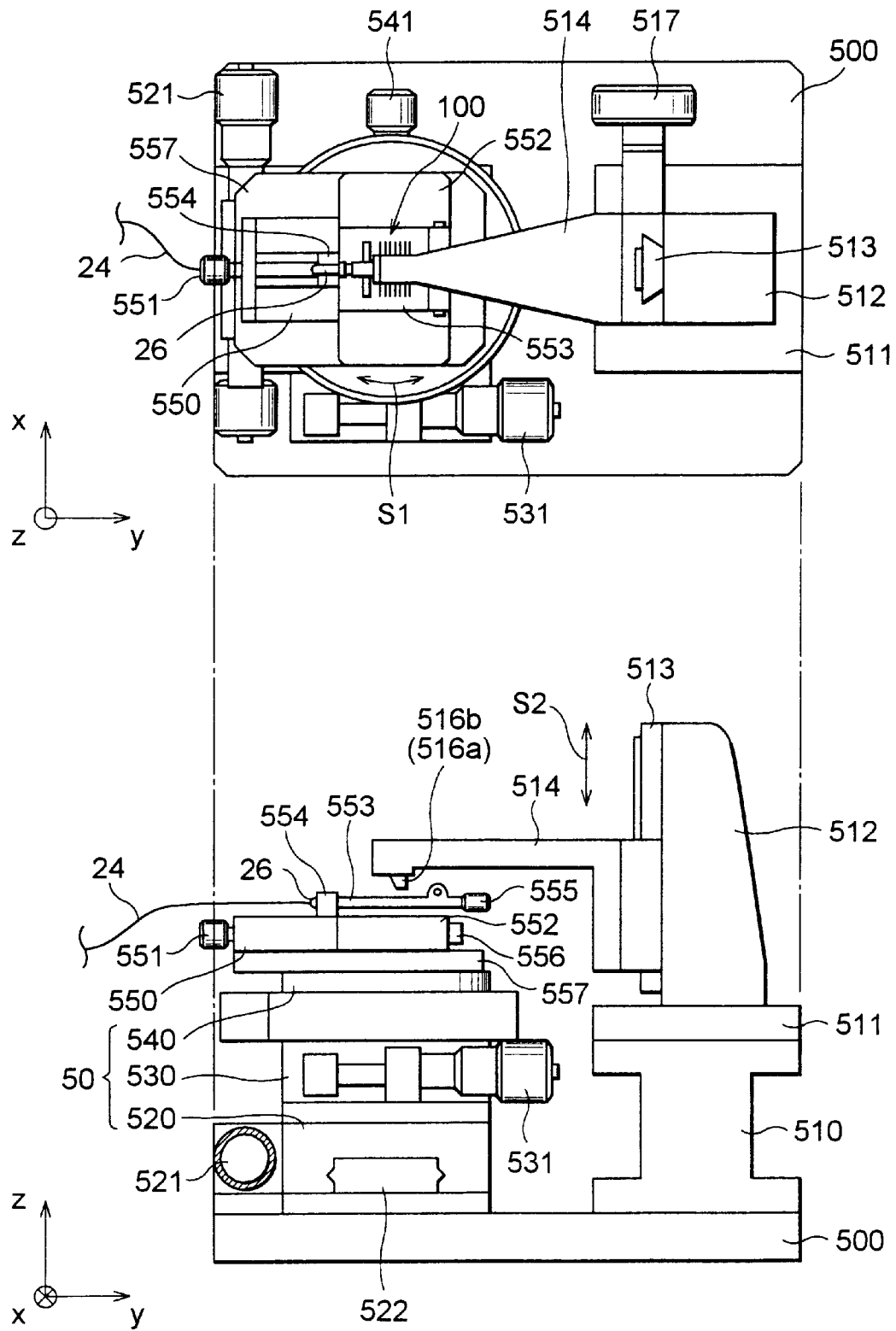
FIG. 9 is a plan and side view showing a configuration of a positioning apparatus for installing at a predetermined position an optical reflecting member having a specific form to be applied to the optical module according to the present invention.

FIG. 9 is a plan and side view showing a configuration of the positioning apparatus for installing the optical reflecting member 12 at a predetermined position within the housing 2. This positioning apparatus comprises one table 500. Disposed on this table 500 are a first mechanism for keeping the optical reflecting member 12 at a still state with respect to the table 500, and a second mechanism for moving the housing 2 (in which the ferrule 26 attached to the tip of the optical fiber 24 is temporarily secured to the inside of the sleeve 22) with respect to the optical reflecting member 12 thus stands still.

The first mechanism comprises a base 510, a stage 511 disposed on the base 510, a supporting portion 512 which is disposed on the stage 511, and a movable cantilever 514 which is supported by the supporting portion 512. A linear guide 513 is attached to the supporting portion 512 along the Z axis shown in FIG. 9, whereas a cantilever 514 is attached to the linear guide 513. Referred to as 517 in this drawing is a control handle for moving the cantilever 514 in the directions indicated by arrow S2 depicted therein (along the linear guide 513).

On the other hand, the second mechanism comprises a driving mechanism 50 for relatively moving the housing 2 with respect to the optical reflecting member 12, and an upper stage 557 which is driven by the driving mechanism and supports the ferrule 26 inserted into the housing 2 and sleeve 22. Onto the upper stage 557, a supporting table 552 is secured with a fastening bolt 556. The supporting table 552 has a positioning structure for installing the housing 2 at a predetermined position, and a fastening member 553 presses the housing 2 against the supporting table 552. The installing position of the housing 2 is adjusted by a regulating bolt 555 along Y axis depicted in this drawing. On the other hand, the ferrule 26 is secured to a holding portion 554. While holding the ferrule 26, the holding portion 554 is supported by a position-regulating mechanism 550, which is controlled by a position-regulating bolt 551 so as to move the holding portion 554 along the depicted Y axis. In this embodiment, the holding portion 554 and the position-regulating mechanism 550 constitute a ferrule-supporting mechanism.

The driving mechanism 50 further comprises an X stage 520 movable along the depicted X axis (along the linear guide 522), a Y stage 530 which is mounted on the X stage 520 and is movable along the depicted Y axis, and a θ stage 540 which is mounted on the Y stage 530 and is rotatable around the depicted Z axis (rotatable in the direction indicated by depicted arrow S1). The upper stage 557 is disposed on the θ stage 540, whereas the X stage 520, Y stage 530, and θ stage 540 are respectively controlled by handles 521, 531, and 541.

Figure 10:
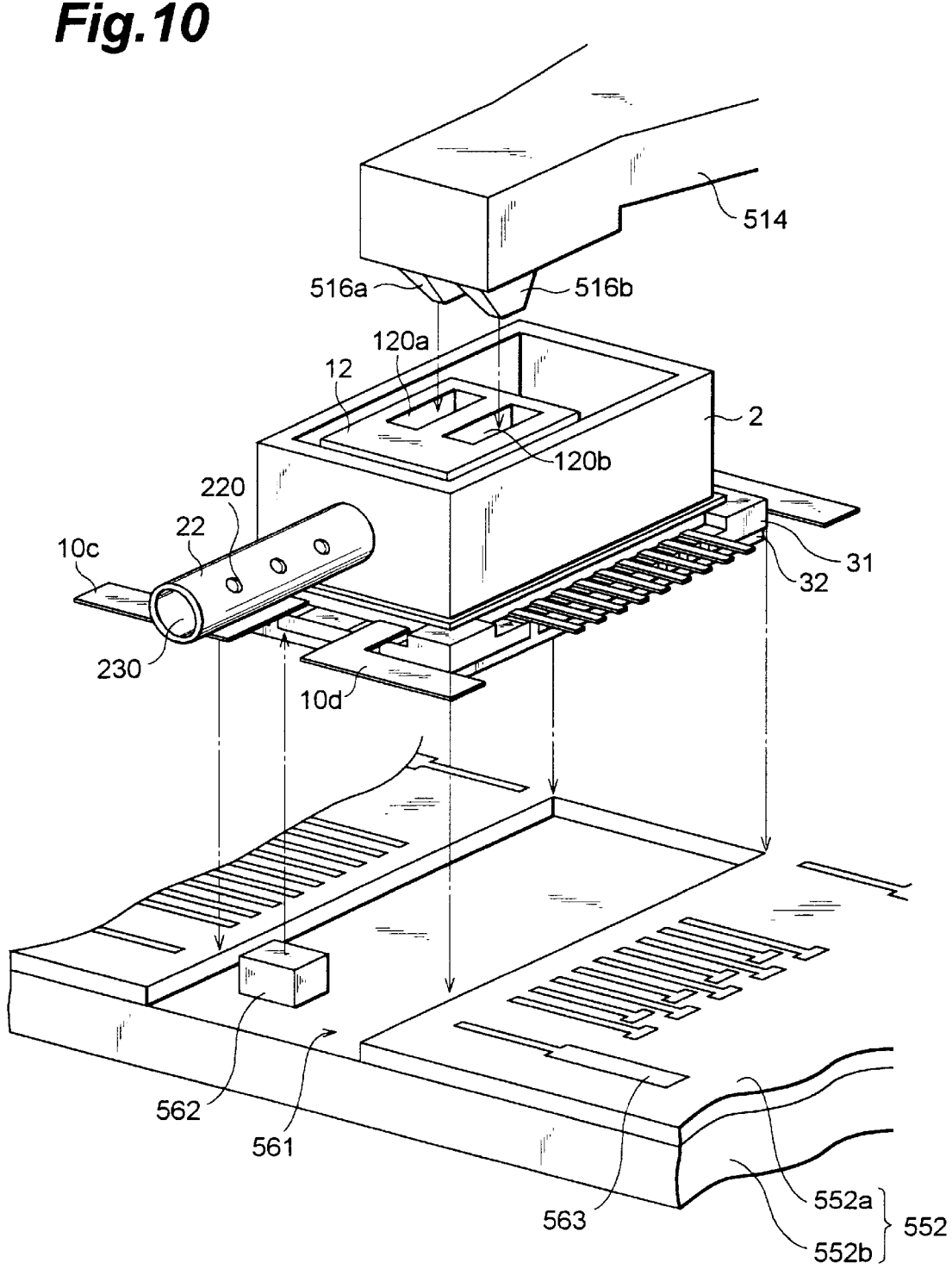
FIG. 10 is a view for explaining a state in which the optical module is installed onto a supporting table of the positioning apparatus shown in FIG. 9.

FIG. 10 is a view for explaining a state in which the housing 2 is installed onto the supporting table 552 of the positioning apparatus shown in FIG. 9. The supporting table 552 is constituted by a supporting plate 552b, and a printed circuit board 552a having a cutout portion and a wiring pattern 563 for electrically connecting with each lead terminal extending from the housing 2. Into a gap portion 561 defined by the main plane of the supporting plate 552b and the cutout portion of the printed circuit board 552a, the base portion (comprising the insulating member 31 and the electrode plate 32) attached to the bottom portion of the housing 2 is fitted. Further, the housing 2 is positioned, while the lead terminals 10c and 10d hold a reference post 562 therebetween, as the position-regulating bolt 555 presses the base portion against the reference post 562. Though not depicted in FIG. 10, in order to keep an electric contact state, the fastening member 553 presses the lead terminals, which project from the housing 2, against their corresponding parts of the wiring pattern 563 on the printed circuit board 552a.

Figure 11:
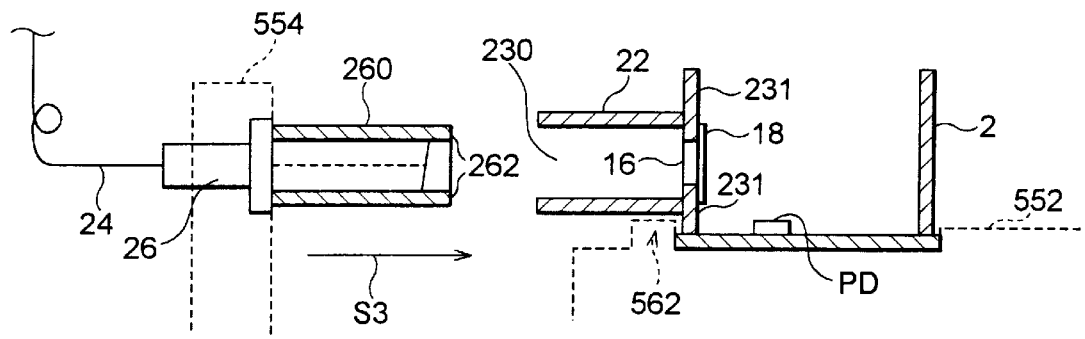
FIGS. 11 and 12 are views for explaining an operation for attaching a ferrule to a sleeve in the positioning apparatus shown in FIG. 9.

On the other hand, as shown in FIG. 11, an auxiliary member 260 is attached to the ferrule 26 held by the holding portion 554, in order for the light-emitting end face of the optical fiber 24 to be installed at a predetermined position within the sleeve 22. As the position-regulating mechanism 550 moves the holding portion 554 in the direction indicated by arrow S3, the ferrule 26 equipped with the auxiliary member 260 is inserted into the sleeve 22 from its opening 230 (see FIG. 12). Here, in order to attain a predetermined strength, the auxiliary member 260 is constituted by a cylindrical metal tube.

Figure 12:
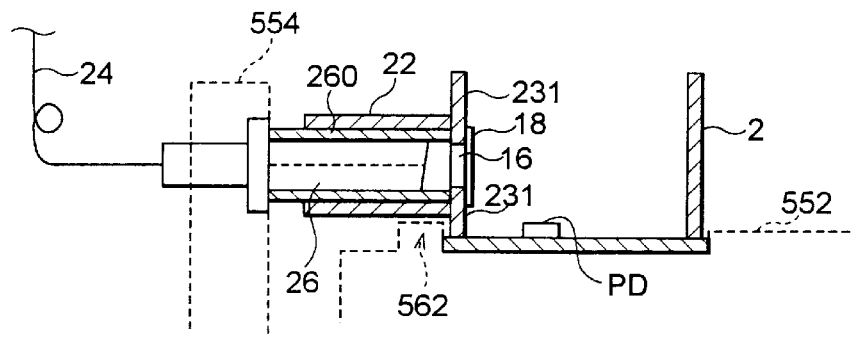

In practice, as shown in FIG. 12, the ferrule 26 is inserted into the sleeve 22 until the flange 231 defining the light entrance hole 16 and an end face 262 of the auxiliary member 260 abut to each other. The tip (including the end face 262) of the auxiliary member 260 extends farther than the tip of the ferrule 26. In the state where the end face 262 of the auxiliary member 260 abuts to the flange 231, an optimal distance is defined in terms of design between the light-emitting end face of the optical fiber 24 supported by the ferrule 26 and the light entrance hole 16.

Figure 13:
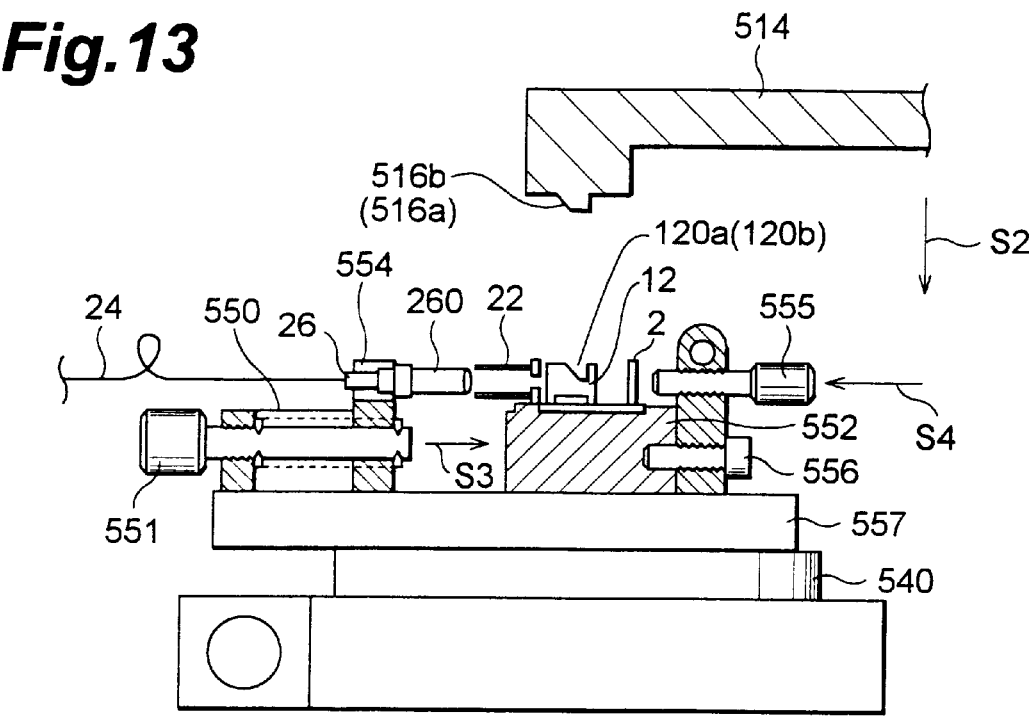
FIGS. 13 and 14 are views for explaining an operation for securing the optical reflecting member in the positioning apparatus shown in FIG. 9.

Further, as shown in FIG. 13, the optical reflecting member 12 is installed within the housing 2 on the supporting table 552, while the lower end portions 12a, 12b, 12c, and 12d are coated with a resin having a bonding function such as ultraviolet-curing resin, thermosetting resin, or the like. Here, since the optical reflecting member 12 is provided with the engagement grooves 120a and 120b, it can be handled by tweezers, so as to be easily installed within the housing 2.

Subsequently, as the tip of the position-regulating bolt 555 moves in the direction indicated by depicted arrow S4, the housing 2 is installed at a predetermined position on the supporting table 552. As the position-regulating mechanism 550 moves the holding portion 554 in the direction of depicted arrow S3, the ferrule 26 held by the holding portion 554, together with the auxiliary member 260, is inserted into the sleeve 22. Also, as the cantilever 514 moves in the direction indicated by depicted arrow S2, the protrusions 516a and 516b of its tip portion fit into their corresponding engagement grooves 120a and 120b in the optical reflecting member 12 installed within the housing 2.

Figure 14:
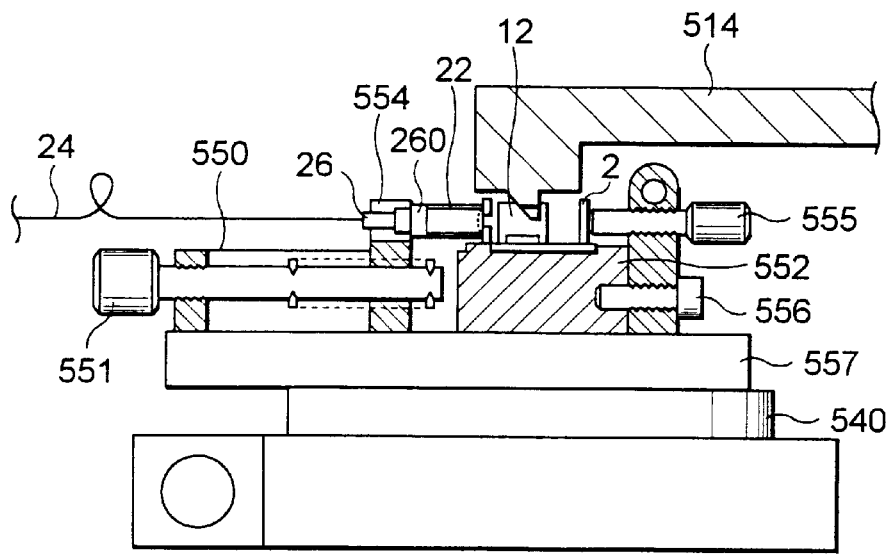

Through the foregoing installing process, the positioning apparatus attains a state shown in FIG. 14, thereby the optical reflecting member 12 stands still with respect to the table 500. Also, the housing 2 is relatively movable by the driving mechanism 50 with respect to the optical reflecting member 12. In the state shown in FIG. 14, the positioning of the optical reflecting member 12 is performed by making signal light incident on the light-reflecting surface of the light-receiving device 6 (PD) from the optical fiber 24 by way of the reflecting surface 14 of the optical reflecting member 12 and monitoring the output of the light-receiving device 6. Namely, while the position of the housing 2 is being changed by the driving mechanism 50 (relative positions of the optical reflecting member 12 and the housing 2 with respect to each other are being changed), a relative positional relationship between the optical reflecting member 12 and the housing 2 is determined where the output from the light-receiving device 6 is maximized.

Then, as the resin coated on each of the lower end portions 12a, 12b, 12c, and 12d of the optical reflecting member 12 is cured at the position where the output signal from the light-receiving device 6 is maximized, the positioning of the optical reflecting member 12 is completed.

Figure 15:
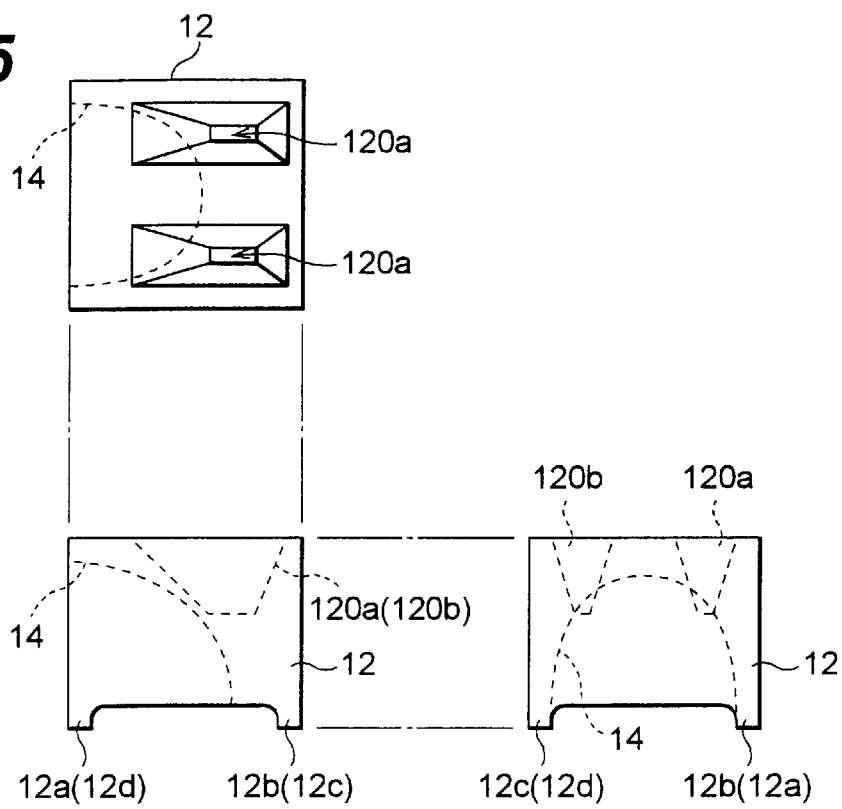
FIG. 15 is a view showing a configuration of the optical reflecting member according to the present invention.

Here, configurations of the optical reflecting member 12 and the tip portion of the cantilever 514 will be explained in more detail. FIG. 15 is a view showing a configuration of the optical reflecting member 12, whereas FIG. 16 is a view showing a configuration of the tip portion of the cantilever 514.

As can be seen from FIG. 15, the optical reflecting member 12 is provided with the lower end portions 12a, 12b, 12c, and 12d projecting from its bottom surface opposing the mount surface (including the surfaces 4a and 4b) of the housing 2 for the light-receiving device 6 toward the mount surface. Also, on the upper surface opposing the above-mentioned bottom surface and facing the tip portion of the cantilever 514, the engagement grooves 120a and 120b extending from this upper surface to the bottom surface are formed. Each of the engagement grooves 120a and 120b has a form in which the opening area tapers down from the upper surface toward the bottom surface.

Figure 16:
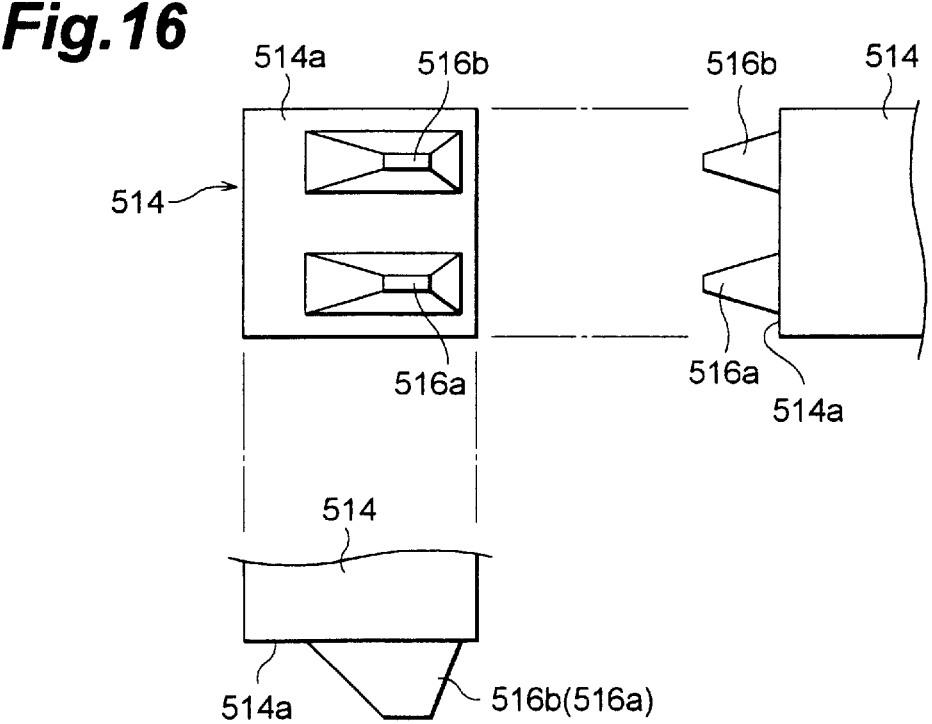
FIG. 16 is a view showing a configuration of a tip portion of a cantilever.

On the other hand, as shown in FIG. 16, the tip portion of the cantilever 514 is provided with tapered protrusions 516a and 516b vertically projecting from its surface 514a facing the optical reflecting member 12.

As the engagement grooves 120a and 120b formed in the optical reflecting member 12 and the protrusions 516a and 516b formed at the tip portion of the cantilever 514 are thus shaped, the protrusions 516a and 516b easily fit into their corresponding engagement grooves 120a and 120b.

Figure 17:
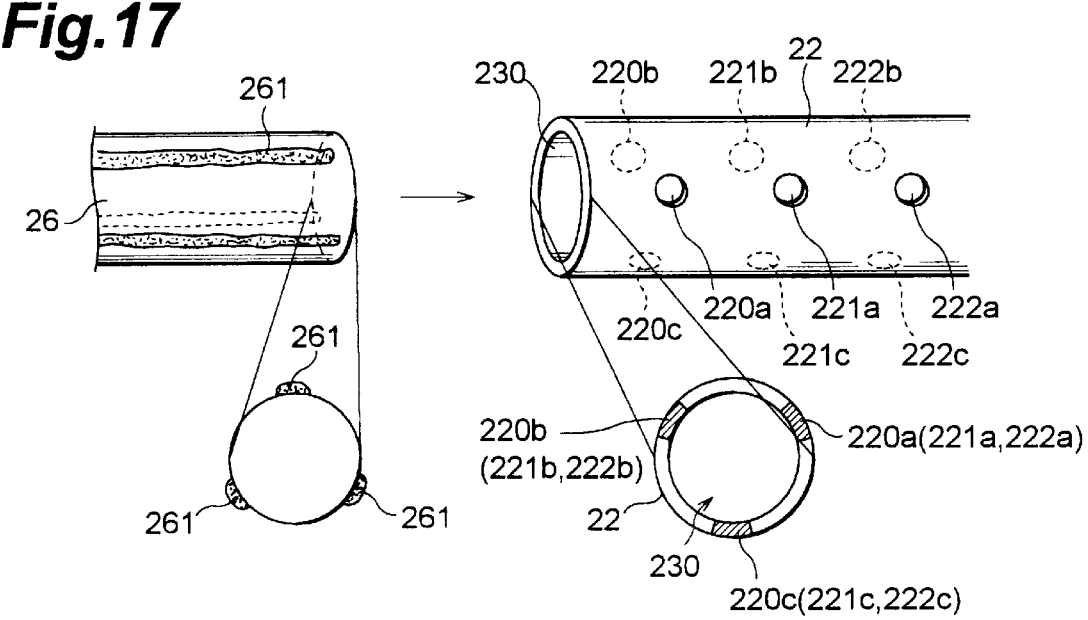
FIGS. 17 to 19 are views for explaining respective bonding steps for attaching the ferrule to a sleeve having a plurality of through holes.
Figure 18:
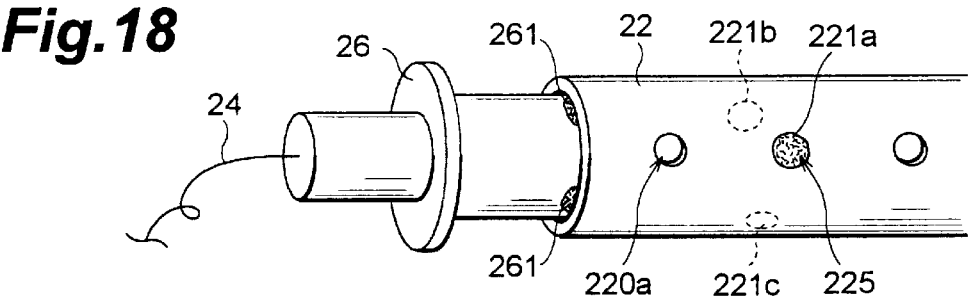
Figure 19:
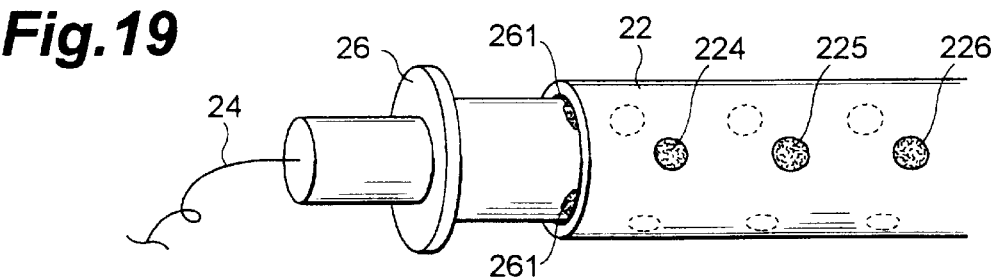

At the time when the positioning of the optical reflecting member 12 is completed, the ferrule 26 and the sleeve 22 have not been bonded and secured together yet. Accordingly, in the following, a method of bonding the ferrule 26 and the sleeve 22 together will be explained with reference to FIGS. 17 to 19. FIGS. 17 to 19 are views for explaining respective bonding steps for attaching a ferrule to a sleeve having a plurality of through holes.

First, as shown in FIG. 17, in a state where a side surface of the ferrule 26 is partly coated with an ultraviolet-curing resin 261, the ferrule 26 is inserted into the sleeve 22 having a plurality of resin-injecting through holes 220. Here, the ultraviolet-curing resin 261 is coated on the ferrule 26 along its longitudinal direction, and the ferrule 26 is inserted into the sleeve 22 such that the resin-coated parts do not overlap with the through holes 220. The through holes formed in the sleeve 22 are constituted by a group of through holes 220a, 221a, and 222a; a group of through holes 220b, 221b, and 222b; and a group of through holes 220c, 221c, and 222c; each group of through holes being aligned along the longitudinal direction of the sleeve 22.

Subsequently, the optical fiber 24 is centered. This centering operation is performed as the position of the ferrule 26 is minutely adjusted by use of a predetermined apparatus along X axis, Y axis, and Z axis which are orthogonal to each other. In this operation, the rotary adjustment of the ferrule 26 (in which the ferrule is rotated around the optical axis of the optical fiber 24) may be performed as well. It is due to the fact that, since the light-receiving module 100 according to the present invention comprises the optical reflecting member 12 having a reflecting surface matching a part of the side surface of a rotational ellipsoid, angular changes in the end face of the optical fiber 24 are less likely to influence the optical coupling efficiency between the optical fiber 24 and the light-receiving device 6.

After the centering operation is thus completed, the gap between the sleeve 22 and the ferrule 26 inserted therein is irradiated with an ultraviolet rays so as to cure the ultraviolet-curing resin existing on the side surface of the ferrule 26 and inner wall of the sleeve 22, thereby temporarily bonding the ferrule 26 and the sleeve 22 together.

Then, as shown in FIG. 18, a two-part (resin+curing agent) mixture epoxy resin 225 is injected into, of the through holes formed in the sleeve 22, each of the through holes 221a, 221b, and 221c, and is cured at room temperature.

Further, as shown in FIG. 19, of the through holes formed in the sleeve 22, a one-part epoxy resin 226 is injected into each of the through holes 220a, 220b, 220c, 222a, 222b, and 222c, and is cured as being heated to about 90° C.

While three kinds of adhesive materials are used in this embodiment in order to bond the ferrule 26 and the sleeve 22 together as mentioned above, the bonding reliability of one-part epoxy resin is higher in general. Nevertheless, when only the ultraviolet-curing resin and the one-part epoxy resin are used alone, part of the ultraviolet-curing resin that has already cured for temporarily bonding may be softened at the time when the one-part epoxy resin is thermally cured, thereby the position of the completely centered ultraviolet-curing ferrule 26 may shift. Therefore, in this embodiment, after the two-part mixture epoxy resin is cured at room temperature so as to determine the position for securing the ferrule 26, the reliable one-part epoxy resin is thermally cured. Accordingly, even if the ultraviolet-curing resin for temporary bonding is softened, the two-part mixture epoxy resin will function to prevent the position of the ferrule 26 from shifting.

As explained in the foregoing, since the optical module according to the present invention comprises an optical reflecting member having a reflecting surface matching a form of a rotational ellipsoid, while the optical reflecting member is disposed such that the light-emitting end face of an optical fiber coincides with one focal point of the rotational ellipsoid, and that the light-receiving surface of a light-receiving device coincides with the other focal point, even when a signal light is emitted from the light-emitting end face of the optical fiber with different directions, it can always reach the light-receiving surface of the light-receiving device. Consequently can be provided is an optical module which is able to exhibit excellent effects such as essentially excellent centering accuracy, easy centering adjustment, no need for adjustment of rotational angle of the optical fiber, decrease in the number of parts, reduction in packaging cost and adjustment cost, and the like.

Also, as the optical reflecting member is provided with at least one engagement groove, it becomes easier to handle the optical reflecting member, and the optical reflecting member can be adjusted with a high accuracy.

Further, as the ferrule attached to the tip of the optical fiber and the sleeve are bonded and secured together by use of three different kinds of adhesives, the position of the ferrule can effectively be prevented from shifting during the bonding operation.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical module comprising:
   a housing accommodating a semiconductor device therein and having a mount surface for holding said semiconductor device thereon;
   a sleeve extending in a predetermined direction from a side wall of said housing and supporting a ferrule attached to a tip of an optical fiber when accommodated therein; and
   an optical reflecting member, accommodated in said housing, for optically coupling said optical fiber and said semiconductor device with each other, said optical reflecting member having a curved reflecting surface.

2. An optical module according to claim 1, wherein said reflecting surface of said optical reflecting member includes a concave surface matching a part of a side surface of a virtually defined rotational ellipsoid.

3. An optical module according to claim 2, wherein said optical reflecting member is arranged at a predetermined position within said housing so that a core end face of said optical fiber facing said reflecting surface coincides with a first focal point of said rotational ellipsoid having the part of the side surface matching said reflecting surface, and that a main surface of said semiconductor device facing said reflecting surface coincides with a second focal point of said rotational ellipsoid different from said first focal point.

4. An optical module according to claim 3, wherein an end face of said optical fiber including said core end face is inclined with respect to an optical axis of said optical fiber by a predetermined angle.

5. An optical module according to claim 1, wherein said optical reflecting member is a resin molded member, and
   wherein said reflecting surface of said optical reflecting member is coated with a metal material.

6. An optical module according to claim 1, wherein said optical reflecting member is a glass formed member, and
   wherein said reflecting surface of said optical reflecting member is coated with a metal material.

7. An optical module according to claim 1, wherein said optical reflecting member is a metal member formed by cutting a metal material.

8. An optical module according to claim 7, wherein said reflecting surface of said optical reflecting member is coated with a metal material.

9. An optical module according to claim 1, wherein said sleeve of said housing is provided with a plurality of through holes along said predetermined direction;
   wherein said ferrule is secured into said sleeve in a state where a part of an inner wall of said sleeve other than said through holes and a side surface of said ferrule are bonded together by an ultraviolet-curing resin, a part of said side surface of said ferrule exposed through part of said through holes is bonded to said sleeve by a two-part adhesive, and a part of said side surface of said ferrule exposed through the rest of said through holes is bonded to said sleeve by a one-part adhesive.

10. An optical reflecting member constituting a part of the optical module according to claim 1 and having said curved reflecting surface, said optical reflecting member comprising:
    a lower surface to face said mount surface of said housing;
    an upper surface opposing said lower surface; and
    a recess extending from said upper surface toward said lower surface.

11. An optical reflecting member according to claim 10, wherein said recess is defined by a tapered side surface such that a bottom of said recess has an area smaller than an area of an opening thereof coinciding with said upper surface.

12. An optical reflecting member according to claim 10, wherein said optical reflecting member further comprises a plurality of protrusions extending from said lower surface toward said mount surface of said housing such that said lower surface is separated from said mount surface by a predetermined distance.

13. An optical reflecting member according to claim 10, wherein said reflecting surface of said optical reflecting member is a concave surface matching a part of a side surface of a virtually defined rotational ellipsoid.

14. An optical reflecting member according to claim 10, wherein said optical reflecting member is a resin member, and
    wherein said reflecting surface of said optical reflecting member is coated with a metal material.

15. An optical reflecting member according to claim 10, wherein said optical reflecting member is a glass formed member, and
    wherein said reflecting surface of said optical reflecting member is coated with a metal material.

16. An optical reflecting member according to claim 10, wherein said optical reflecting member is a metal member formed by cutting a metal material.

17. An optical reflecting member according to claim 16, wherein said reflecting surface of said optical reflecting member is coated with a metal material.

18. A method of positioning the optical reflecting member according to claim 10, said method comprising the steps of:
    inserting said ferrule attached to said tip of said optical fiber into said sleeve of said housing;
    installing said optical reflecting member within said housing such that, under a condition that said semiconductor device is covered with said reflecting surface, a predetermined part of said optical reflecting member to which a resin having an adhesive function is attached abuts to said mount surface of said housing with said resin being interposed therebetween; and
    adjusting a relative position between said housing and said optical reflecting member by monitoring a signal light intensity outputted from said optical fiber or monitoring an electric signal outputted from said semiconductor device.

19. A method according to claim 18, wherein an auxiliary member for installing said ferrule at a predetermined position within said housing is attached to a tip of said ferrule.

20. An apparatus for positioning the optical reflecting member according to claim 10, said apparatus comprising:

a supporting table for installing and holding said housing at a predetermined position;

a supporting mechanism for supporting said ferrule attached to said tip of said optical fiber to be inserted into said sleeve of said housing;

a securing member having a structure for pressing said optical reflecting member against said mount surface of said housing and securing a relative position between said housing and said optical reflecting member, wherein said optical reflecting member is installed within said housing such that, under a condition that said semiconductor device is covered with said reflecting surface, a predetermined part of said optical reflecting member to which a resin having an adhesive function is attached abuts to said mount surface of said housing with said resin being interposed therebetween; and a driving mechanism for adjusting said relative positional relationship between said housing and said optical reflecting member.

21. An apparatus according to claim 20, wherein said driving mechanism comprises:

an X stage for moving a supporting table holding said housing along a first reference axis, whereby said X stage relatively moves said housing along said first reference axis with respect to said optical reflecting member and said securing member;

a Y stage for moving said supporting table along a second reference axis orthogonal to said first reference axis, whereby said Y stage relatively moves said housing along said second reference axis with respect to said optical reflecting member and said securing member; and a θ stage for rotating orthogonal to said first and second axes said supporting table around a third reference axis, whereby said θ stage relatively rotates said housing around said third reference axis with respect to said optical reflecting member and said securing member.

22. An apparatus according to claim 20, wherein a tip of said securing member is provided with a protrusion to be inserted into a recess formed in an upper surface of said optical reflecting member.

23. An apparatus according to claim 22, wherein said protrusion of said securing member includes a tapered form.

24. A method of making the optical module according to claim 1, said method comprising:

a first step of inserting said ferrule in which an ultraviolet-curing resin is coated on a predetermined part of a side surface thereof into said sleeve of said housing having a plurality of through holes, and irradiating a gap between said side surface of said ferrule and an inner wall of said sleeve with ultraviolet rays so as to bond a part of said inner wall of said sleeve other than said through holes and said side surface of said ferrule together;

a second step of injecting a two-part adhesive into a part of said through holes in said sleeve, injecting a one-part adhesive into the rest of said through holes, and curing said two-part adhesive at room temperature, whereby a part of said side surface of said ferrule exposed through said part of said through holes and said sleeve are bonded together; and a third step of heating said one-part adhesive at a predetermined temperature so as to cure said one-part adhesive, whereby a part of said side surface of said ferrule exposed through the rest of said through holes and said sleeve are bonded together.

\* \* \* \* \*